United States Patent
Aust

(10) Patent No.: US 12,547,806 B2
(45) Date of Patent: Feb. 10, 2026

(54) METHOD FOR SIMULATING AN ELECTRIC MOTOR

(71) Applicant: dSPACE GmbH, Paderborn (DE)

(72) Inventor: Martin Aust, Paderborn (DE)

(73) Assignee: DSPACE GMBH, Paderborn (DE)

(*) Notice: Subject to any disclaimer, the term of this patent is extended or adjusted under 35 U.S.C. 154(b) by 1061 days.

(21) Appl. No.: 17/535,743

(22) Filed: Nov. 26, 2021

(65) Prior Publication Data
US 2022/0180032 A1 Jun. 9, 2022

(30) Foreign Application Priority Data

Dec. 3, 2020 (DE) .......................... 102020132119.8

(51) Int. Cl.
*G06F 30/331* (2020.01)

(52) U.S. Cl.
CPC ................................ *G06F 30/331* (2020.01)

(58) Field of Classification Search
CPC .................................................... G06F 30/331
See application file for complete search history.

(56) References Cited

U.S. PATENT DOCUMENTS

| 11,062,071 B2 | 7/2021 | Chandra et al. |
| 2011/0307233 A1 | 12/2011 | Tseng et al. |
| 2019/0339944 A1 | 11/2019 | Olsen |
| 2021/0200711 A1 | 7/2021 | Pillai et al. |

FOREIGN PATENT DOCUMENTS

| CA | 2420022 A1 | 2/2003 |
| DE | 102019107817 A1 | 10/2020 |
| JP | 2005500625 A | 1/2005 |
| JP | 2006318200 A | 11/2006 |

OTHER PUBLICATIONS

Ponce (Ponce, P., Ibarra, L., Molina, A., & MacCleery, B. (2012). Real time simulation for DC and AC motors based on LabVIEW FPGAs. IFAC Proceedings vols. 45(6), 1777-1784.) (Year: 2012).*

* cited by examiner

*Primary Examiner* — Bijan Mapar
(74) *Attorney, Agent, or Firm* — LEYDIG, VOIT & MAYER, LTD.

(57) ABSTRACT

A method for real-time simulation of an electric motor includes: modeling, by a computer system, the electrical motor in a graphical model including at least two blocks connected by signals. The graphical model includes at least two matrix operations which produce a multidimensional output signal from at least one multidimensional input signal. The computer system includes an operator computer and a real-time computer connected thereto, wherein the operator computer executes a graphical modeling environment, and the real-time computer has at least one programmable logic device.

14 Claims, 3 Drawing Sheets

METHOD FOR SIMULATING AN ELECTRIC MOTOR

CROSS-REFERENCE TO PRIOR APPLICATIONS

This application claims benefit to German Patent Application No. DE 102020132119.8, filed on Dec. 3, 2020.

FIELD

The invention relates to a computer-implemented method for real-time simulation of an electrical circuit, in particular of an electric motor, a computer system, and a computer-readable storage medium.

BACKGROUND

Modern products, such as control units, are often developed with the aid of computer-based simulations of a dynamic system. For example, it is possible to simulate the system controlled by a controller in order to test a component, such as a control unit, in a hardware-in-the-loop simulation prior to completion of the overall product. To this end, special real-time computers are used that ensure a response within a predetermined maximum period of time. The system dynamics are often limited, so that, for example, a maximum latency in the range of milliseconds is appropriate and a real-time computer with a standard processor can be used.

However, for electrical circuits such as an electric motor or an inverter for controlling an electric motor the maximum permissible latency for real-time simulation may be in the range of microseconds. In such cases, it is preferred to use a real-time computer having a programmable logic device, in particular a field-programmable gate array (FPGA). It may also be provided that the control or a slower, higher-level closed-loop control be performed by a computing node having a processor that exchanges data with the programmable logic device. An FPGA is configured by reading a bitstream that directly influences the interconnection of the individual logic elements and thus determines the implemented circuit. DE 102019107817 A1 describes a method for simulating a dynamic system that enables in particular small electronic circuits to be simulated with particularly short latencies using a fixed predefined configuration. Since the characteristics of electric motors such as, for example, the number of poles of the stator may greatly differ, and because different discretization methods (or solvers) are used depending on the particular application, it is convenient not to use a fixed configuration, but to generate the bitstream in a model-based fashion for the specific motor. However, in the prior art, this is associated with poor utilization of resources and a relatively long latency.

SUMMARY

In an exemplary embodiment, the present invention provides a method for real-time simulation of an electric motor. The method includes: modeling, by a computer system, the electrical motor in a graphical model including at least two blocks connected by signals. The graphical model includes at least two matrix operations which produce a multidimensional output signal from at least one multidimensional input signal. The computer system includes an operator computer and a real-time computer connected thereto, wherein the operator computer executes a graphical modeling environment, and the real-time computer has at least one programmable logic device. Matrix operations are implemented in two separate blocks, wherein the two separate blocks comprise a matrix routing block and a matrix calculation block. The matrix routing block is configured to supply the matrix calculation block with at least one input signal and to store a calculated output signal. The matrix calculation block is configured to perform an operation on a currently received input signal in order to calculate an output signal. A first matrix operation and a second matrix operation include two separate matrix routing blocks and one common matrix calculation block. A matrix routing block of the first matrix operation and a matrix routing block of the second matrix operation alternately provide input signals to the matrix calculation block and receive output signals. A bitstream is generated from at least a portion of the graphical model including the matrix operations and executed on the programmable logic device.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
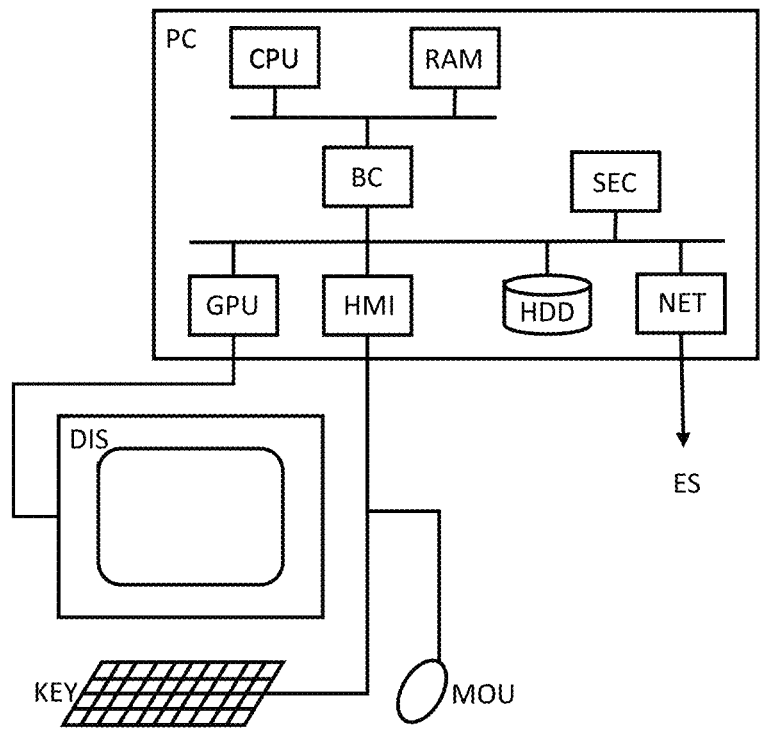
FIG. 1 shows a preferred embodiment of an operator computer.

Exemplary embodiments of the invention to provide a method and a device for simulating an electrical circuit, in particular an electric motor, which utilize FPGA resources more efficiently.

In an exemplary embodiment, the invention provides a method for real-time simulation of an electrical circuit, in particular of an electric motor, where the electrical circuit is modeled in a graphical model including at least two blocks connected by signals, the graphical model including at least two matrix operations which produce a multidimensional output signal from at least one multidimensional input signal. The method is performed on a computer system including an operator computer and a real-time computer connected thereto, the operator computer executing a graphical modeling environment, and the real-time computer having at least one programmable logic device. Matrix operations are implemented in two separate blocks: a matrix routing block and a matrix calculation block, the matrix routing block being configured to supply the matrix calculation block with the respective at least one input signal and to store the calculated output signal, the matrix calculation block being configured to perform an operation on a currently received input signal in order to calculate an output signal. The first matrix operation and the second matrix operation include two separate matrix routing blocks but one common matrix calculation block, the matrix routing block of the first matrix operation and the matrix routing block of the second matrix operation alternately providing input signals to the matrix calculation block and receiving output signals. A bitstream is generated from at least a portion of the graphical model including the matrix operations and executed on the programmable logic device.

In an embodiment of the invention, there is provided a method for real-time simulation of an electrical circuit, in particular of an electric motor, where the characteristics of the electrical circuit are modeled in a graphical model including at least two blocks connected by signals, the graphical model including at least two matrix operations which produce a multidimensional output signal from one or more multidimensional input signals. The method is performed on a computer system including an operator computer and a real-time computer connected thereto, the operator computer executing a graphical modeling environment, and the real-time computer having at least one programmable logic device. Matrix operations are implemented in two separate blocks: a matrix routing block and a matrix calculation block, the first matrix operation and the second matrix operation including two separate matrix routing blocks but one common matrix calculation block, the first and second matrix routing blocks being configured to supply the matrix calculation block with the input signal or input signals and to store the calculated output signal, the matrix calculation block being configured to receive different input signals in successive cycles and to subject them to these operations, the resulting output signal not being stored in the matrix calculation block, and a bitstream being generated from at least a portion of the graphical model including the matrix operations and executed on the programmable logic device.

Advantageously, exemplary embodiments of the invention enable better utilization of the hardware resources of the FPGA and allow for reduced or optimized latency of the calculations so that the sampling rates can be maximized.

In addition, the accuracy of calculation may be increased. The data type of the input signal and/or the data type of the output signal and/or the data type of the elements of the matrix are preferably a floating-point type, such as, in particular, double. Exemplary embodiments of the invention are applicable regardless of the data type and are not limited to fixed-point types which are problematic in terms of accuracy and scaling.

It is useful if the matrix calculation block is configured to perform an operation on the elements of at least one input signal in a row-wise parallel manner. In order to achieve a good compromise between resource requirements and latency, it may be provided for the columns of the input signal to be processed sequentially. Similarly, it is possible to perform a column-wise parallel calculation with a row-by-row sequential calculation.

In an embodiment of the invention, the number of elements processed in parallel can be adjusted as a function of a parameter, in particular an input received from a user or a characteristic of the programmable logic device, prior to generation of the bitstream. For example, an entire input line may be processed in parallel if the parameter exceeds a threshold. If the parameter falls below the threshold, the line may be divided into several blocks, only the elements of a block being processed in parallel. By adjusting the number of values processed in parallel, the free area available on the programmable logic device or the logic elements available can be used in the best possible way.

Preferably, the matrix calculation block is configured to process square matrices, the size of the square matrix being selected in such a way that it can include both the input signals of the first matrix operation and the input signals of the second matrix operation, the selection being made in particular based on the respective largest dimension of an input signal, and the calculation of the square matrix being stopped as soon as all elements of the output signal of the currently active matrix operation have been calculated. This enables high parallelization and thus low latency without excessive consumption of free space on the programmable logic device.

Preferably, the matrix calculation block does not buffer the output signal resulting from performing an operation on an input signal. This avoids excessive consumption of memory resources in the programmable logic device.

Preferably, the matrix routing block of the first matrix operation and the matrix routing block of the second matrix operation receive a trigger signal and pass it on in order to determine the active matrix routing block, whereas the matrix calculation block is always active. The matrix routing block that receives a trigger signal is active and sends its input signals to the matrix calculation block, which then performs the desired matrix calculation. Upon receipt of the result, the currently active matrix routing block advantageously passes the trigger signal on so that the next matrix routing block can become active. Thus, particularly preferably, upon receipt of the trigger signal, a matrix routing block provides the at least one input signal to the connected matrix calculation block and forwards the trigger signal after storing the resulting output signal.

Preferably, more than two matrix routing blocks can be connected to a matrix calculation block, and the matrix calculation block is configured to continuously perform the matrix operations of all connected matrix routing blocks so that all matrix operations belonging to a connected matrix routing block are performed once in each time step of the simulation. It may also be provided to use a scheduler that controls the execution of the matrix operations based on an externally defined sequence or a higher-level closed-loop control.

Preferably, the graphical model includes more than one matrix calculation block, at least two first matrix routing blocks being connected to the first matrix calculation block, and at least two second matrix routing blocks being connected to the second matrix calculation block. In particular, the first matrix calculation block performs the calculations of the first matrix routing blocks sequentially in each time step, while the second matrix calculation block performs the calculations of the second matrix routing blocks sequentially in each time step. Alternatively, it may be provided to use a scheduler in each case. By using multiple instances of matrix calculation blocks, more calculations can be performed in parallel (as long as the required resources are available on the programmable logic device). The size of the matrix calculation blocks may be selected based on the respective input signals, the first matrix calculation block having a different size than the second matrix calculation block if the input signals have different dimensions.

Preferably, a matrix calculation block supports different matrix operations, such as addition of two matrices, multiplication of a matrix by a matrix, or multiplication of a matrix by a vector, the active matrix operation being selected based on a control signal. A specific embodiment may also provide that a predetermined mathematical function be performed on each element of an input matrix. For example, the inverse value 1/x or a trigonometric function such as sin x, cos x, or tan x may be calculated. It is advantageous if the type and number of supported arithmetic operations or functions are defined in the model or selected as a function of a parameter. In particular, the provided functionality of the matrix calculation block may be selected as a function of the free area or the available logic elements of the programmable logic device used.

Preferably, the matrix routing blocks are configured to adapt, in particular to rename, input signals or to move elements to desired areas of the matrix calculation block, and to output a control signal to the matrix calculation block to select an active matrix operation.

The invention further relates to a computer system including an operator computer having a human-machine interface and a working computer, the working computer including a processor and a programmable logic device and being adapted to perform a method according to the invention.

Furthermore, the invention relates to a computer-readable storage medium having instructions embedded therein which, when executed by a computer system including a processor and a programmable logic device, cause the computer system to be adapted to perform a method according to the invention.

The invention will now be described in more detail with reference to the drawings, in which like parts are designated by the same reference numerals. The illustrated embodiments are highly schematic; i.e. the distances and dimensions are not true to scale and, unless indicated otherwise, do not have any derivable geometric relations to each other either.

FIG. 1 shows a preferred embodiment of an operator computer PC. The operator computer has a processor CPU, which may in particular be implemented as a multi-core processor, a main memory RAM, and a bus controller BC. Operator computer PC is preferably designed to be manually operated directly by a user, a monitor DIS being connected via a graphics card GPU, and a keyboard KEY and a mouse MOU being connected via a peripheral interface HMI. In principle, operator computer PC could also have a touch interface. The operator computer further includes a non-volatile data storage device HDD, which may in particular be configured as a hard disk and/or solid-state disk, as well as an interface NET, in particular a network interface.

Interface NET allows connection of additional computers, such as, in particular, a real-time computer ES. In principle, one or more interfaces of any type, in particular wired interfaces, may be provided on operator computer PC and may each be used for connecting to other computers. Conveniently, a network interface according to the Ethernet standard may be used, where at least the physical layer is implemented in compliance with the standard. One or more higher protocol layers may also be implemented in a proprietary manner or in a manner adapted to the real-time computer. Interface NET may also be implemented in a wireless form, such as, in particular, as a WLAN interface or according to a standard such as Bluetooth. This may also be a mobile cellular connection, such as LTE, where the exchanged data is preferably encrypted. It is advantageous if at least one interface of the operator computer is implemented as a standard Ethernet interface, so that other computers and/or servers can easily be connected to operator computer PC.

Operator computer PC may have a secure data container SEC, which facilitates the use of licensed applications on the operator computer and also allows the operator computer to be used as a license server for the real-time computer. Secure data container SEC may be implemented in the form of a dongle, for example, that is connected, in particular, to a peripheral interface. Alternatively, provision may be made for a secure data container SEC to be permanently integrated as a component in the operation computer or to be stored in the form of a file on non-volatile data storage device HDD.

Figure 2:
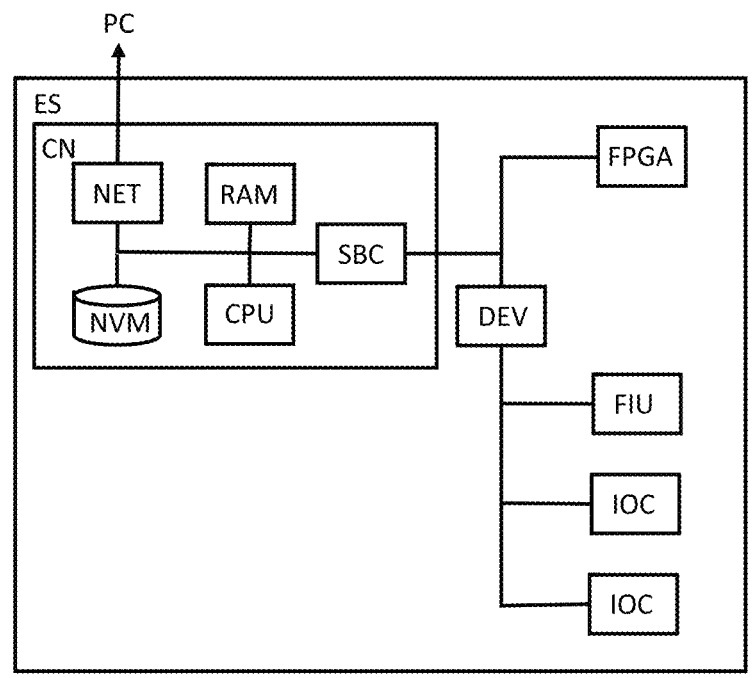
FIG. 2 shows a preferred embodiment of a real-time computer.

FIG. 2 shows a preferred embodiment of a real-time computer ES. Real-time computer ES includes a computing node CN that is connected to an operator computer PC via a network interface NET. In principle, the connection needs to exist only while the configuration of real-time computer ES is adapted. Preferably, it exists permanently. Computing node CN has at least one processor CPU, particularly a multi-core processor, or multiple processors, a main memory RAM, and a non-volatile memory NVM that preferably stores an operating system and/or a bootloader. At least one logic board FPGA and a device interface DEV are connected to the computing node via a high-speed bus SBC or a corresponding controller. Logic board FPGA includes a programmable logic device that can be configured in accordance with the present invention. Provision may also be made for real-time computer ES to have multiple logic boards FPGA or multiple programmable logic devices on a logic board. Device interface DEV can be used to connect a multiplicity of modules, such as a fault simulation circuit FIU that applies defined electrical faults to connected devices, or interface cards IOC, which provide one or more analog or digital I/O channels.

Figure 3:
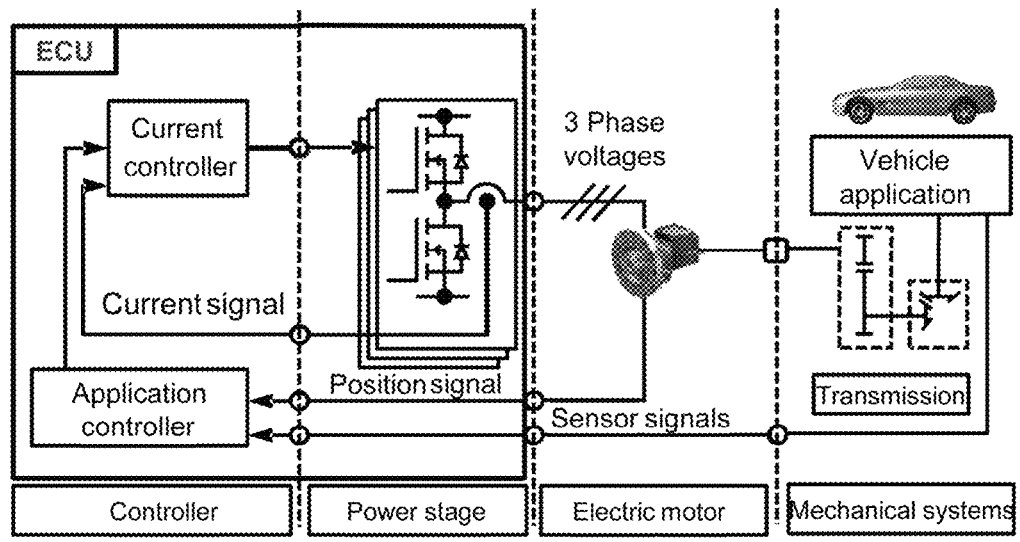
FIG. 3 schematically illustrates the components of a hybrid vehicle.

FIG. 3 illustrates schematically the components of a hybrid vehicle or of a motor vehicle that is at least temporarily powered by an electric motor.

The electric motor is controlled by a control unit ECU including a controller and a power stage. The control unit is connected to an electric motor and supplies it with, for example, three phase voltages. The electric motor may also have a larger number of coils, which are supplied with a correspondingly higher number of phase voltages or currents. The electric motor is mechanically coupled to a transmission via which one or more vehicle wheels can be driven. However, electric motors are also used in a number of other vehicle applications, which can also be simulated. The vehicle has a number of sensors, such as wheel speed sensors. At least one output signal of a sensor or one or more sensor signals are provided to the vehicle control unit. The electric motor may also have a number of sensors, such as a position sensor which indicates the position of the rotor relative to the stator; this position signal also being provided to the control unit.

The control unit includes an application controller that receives the sensor signals of the vehicle and the position signal of the electric motor and determines therefrom setpoints for the at the individual phases of the electric motor. A current controller controls the semiconductor switches of the power stage or of the inverter according to the setpoints or based on a comparison to the current signal of a current sensor, such as a shunt resistor, disposed in the power stage.

The different levels that a simulation of the electric motor may tackle are indicated by three dashed lines. At the signal level, at which the controller operates, only electrical signals or numerical values are present. The inverter operates at the electrical power level, where substantial electrical voltages and currents or electrical power can occur. The electric motor converts this electrical power into mechanical forces.

If the overall system including the control unit and the motor is to be tested at the mechanical level, a corresponding test bench is required. A test of the control algorithms at the signal level could also be carried out in the form of a software simulation where appropriate.

Figure 4:
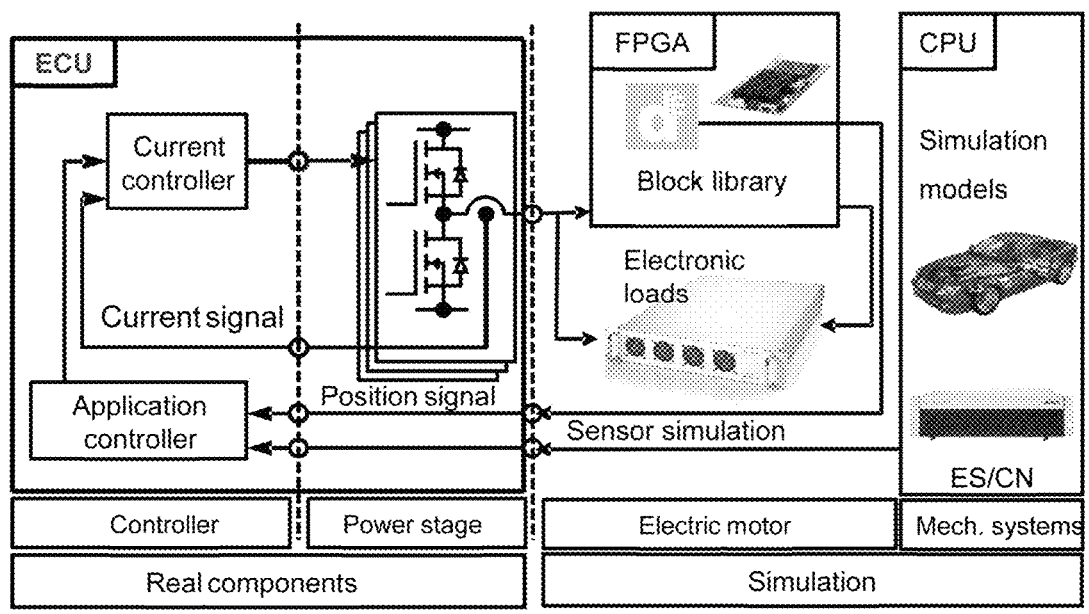
FIG. 4 schematically illustrates a simulation of a hybrid vehicle.

FIG. 4 shows a schematic representation of a simulation of a hybrid vehicle or of a motor vehicle that is at least temporarily powered by an electric motor.

The simulation system shown includes electronic loads which can process or manipulate the voltages and currents occurring at the electrical power level. This enables testing of a control unit present as a real component without the entire vehicle already being present and without the occurrence of the risks that are associated with a test drive. The vehicle or the mechanical components are simulated based on simulation models on a processor CPU of computing node CN or of real-time computer ES. The sensor signals required by the control unit are generated by a sensor simulation performed by the processor and/or a programmable logic device FPGA.

In order to ensure low latency, the electronic loads are controlled by the programmable logic device FPGA, whose configuration was created, for example, using a block library. Preferably, the block library includes matrix routing blocks and matrix calculation blocks for performing a method according to the invention.

Figure 5:
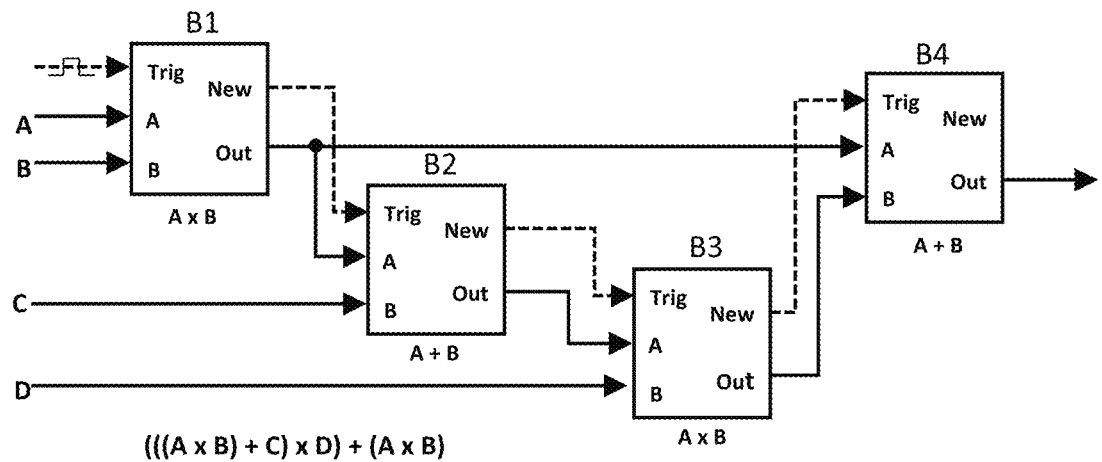
FIG. 5 schematically illustrates a graphical model including a plurality of matrix operations.

FIG. 5 schematically shows a graphical model including a plurality of matrix operations.

The model shown includes four matrix operation blocks B1, B2, B3, B4, which are interconnected via signals. Each matrix operation block has two input signals and outputs an output signal. Block B1 receives two matrix signals A, B and calculates the product A×B. Block B2 receives the output signal from B1 and another matrix signal C and calculates the sum (A×B)+C. Block B3 receives the output signal from B2 and another matrix signal D and calculates the product (A×B)+C)×D. Block B4 receives the output signals from B1 and B3 and outputs the sum ((A×B)+C)×D)+(A×B) as an output signal.

Since the temporal processing causes a certain delay and a subsequent calculation has to wait for the result of the previous calculation stage, subsequent operations are advantageously triggered by an external pulse. The matrix operation blocks have a trigger input Trig for this purpose. When the calculation is complete, the trigger pulse is passed on to the next component via trigger output New to activate the calculation.

If the matrix operation blocks are implemented as monolithic blocks as is common in the prior art, this results in poor utilization of the HW because a matrix calculation is only active for a short time ("work time") and waits for the next pulse after the calculation is complete ("idle time"). However, the next trigger pulse is not received until the entire chain of matrix operation blocks has been passed through. This results in a low utilization of an implemented matrix calculation or a poor work-idle ratio. The matrix operation blocks occupy a large area on the programmable logic device.

Figure 6:
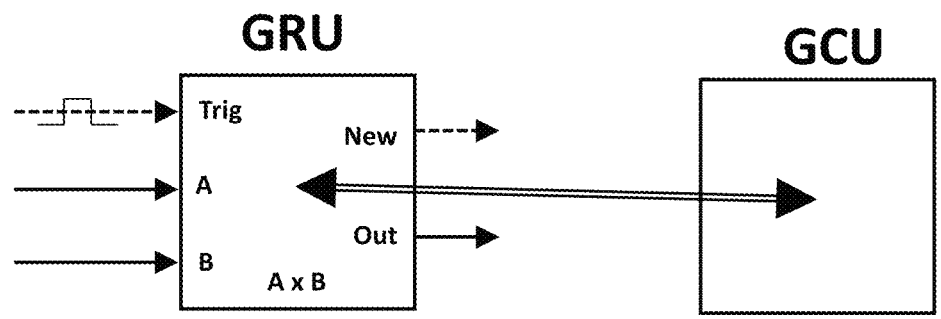
FIG. 6 shows an embodiment of a matrix operation via a matrix routing block and a matrix calculation block.

FIG. 6 illustrates an embodiment of a matrix operation via a matrix routing block and a matrix calculation block in accordance with the invention.

Instead of a monolithic matrix operation block, a matrix routing block GRU and a matrix calculation block GCU are used. Matrix routing block GRU receives input signals A, B and outputs output signal Out. Furthermore, matrix routing block GRU has a trigger input Trig and a trigger output New. Matrix routing block GRU provides a "gateway/routing" functionality and forwards the respective data to a linked matrix calculation block GCU that performs the respective calculation. Upon completion of the calculation, the result is, in turn, stored in matrix routing block GRU, which also forwards the trigger signal.

Multiple matrix routing blocks may be connected to a single matrix calculation block GCU. Since the subsequent calculation is performed by the same matrix calculation block GCU, it is possible to achieve a much better utilization of the logic elements on the programmable logic device. Only calculation block GCU requires dedicated hardware resources for calculations and, in addition to various basic arithmetic operations, may also support more complex calculations applicable to matrices. Advantageously, a matrix routing block GRU selects the current arithmetic operation of the matrix calculation block via a configuration signal or configuration word, thus allowing the matrix calculation block to be controlled as needed.

Figure 7:
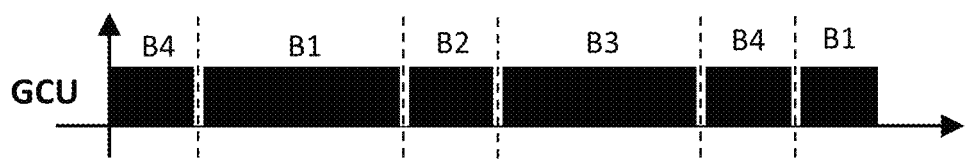
FIG. 7 shows a schematic diagram illustrating the utilization of a matrix calculation block which performs the matrix operations of FIG. 5.

FIG. 7 shows a schematic diagram illustrating the utilization of a matrix calculation block GCU which performs the matrix operations of FIG. 5.

The diagram indicates which of the numbered matrix operations or blocks B1, B2, B3, B4 are currently executed by matrix calculation block GCU. The matrix calculation block is utilized to a high degree, and it is only at the transitions between different matrix operations (indicated by dashed lines) that a short delay may occur.

If more processing power is needed, it is possible to multiply matrix calculation block GCU; i.e., to use multiple blocks GCU which are connected to some of the matrix routing blocks GRU and thus implement parallel processing.

In an embodiment of the invention, the matrix routing blocks and the matrix calculation blocks may be implemented in a block library for a technical computing environment such as MATLAB/Simulink. It is advantageous if the matrix routing blocks have a user interface that allows selection of a matrix calculation block to which the input signals are provided for calculation. In the user interface, it is also possible to select the desired arithmetic operation, such as a matrix multiplication, a matrix addition, or the elementwise application of a predetermined function to the elements of an input matrix. Matrix calculation blocks can be configured as generic calculation blocks that support a given scope of calculations, the connected matrix routing blocks selecting the desired calculation from the given scope via a signal or a command. It may also be provided that matrix calculation blocks have a user interface in which a degree of parallelization of the calculations can be selected. In particular, an entire row of the matrix may be processed in parallel or divided into blocks processed in parallel, which can be selected by a user, for example, using a slider. The block library may contain matrix calculation blocks of different sizes, so that a suitable block can be readily selected. An association between matrix routing blocks and matrix calculation blocks can be performed using a calculation number and/or block identifiers or names. A bitstream for a programmable logic device may be generated from a created model using, for example, Xilinx System Generator.

The described method of calculation provides the following advantages:

The sequence of matrix operations can be readily understood with the aid of the signal paths between the matrix routing blocks; the model remains readable.

The routing of matrix routing blocks GRU to different matrix calculation blocks GCU is implemented transparently for the user.

Dedicated computing hardware resources such as DSP slices are better utilized.

By using fewer calculation blocks, more dedicated hardware resources can be used per block for calculation, which provides additional advantages:

Matrix calculations can be set up substantially in parallel, which minimizes latency.

Matrix calculations can be implemented with a higher bit width (e.g., double precision instead of single precision), which allows for a more accurate simulation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer system for real-time simulation of an electrical circuit, comprising:
an operator computer configured to execute a graphical modeling environment and to generate a bitstream; and
a real-time computer comprising at least one programmable logic device, wherein the at least one programmable logic device comprises at least one field-programmable gate array (FPGA);
wherein the operator computer is configured to model the electrical circuit in a graphical model;
wherein the graphical model includes a first matrix routing block, a second matrix routing block, and a common matrix calculation block;
wherein the first matrix routing block is configured to receive a first multidimensional input signal and a second multidimensional input signal, wherein the common matrix calculation block is configured to perform a first matrix operation performed on the first multidimensional input signal and the second multidimensional input signal, wherein the first matrix operation produces a first multidimensional output signal, and wherein the first matrix routing block is configured to store the first multidimensional output signal and output the first multidimensional output signal to the second matrix routing block;
wherein the second matrix routing block is configured to receive the first multidimensional output signal and a third multidimensional input signal, wherein the common matrix calculation block is configured to perform a second matrix operation performed on the first multidimensional output signal and the third multidimensional input signal, wherein the second matrix operation produces a second multidimensional output signal, and wherein the second matrix routing block is configured to store the second multidimensional output signal and output the second multidimensional output signal;
wherein the bitstream is generated from at least a portion of the graphical model including the first and second matrix operations; and
wherein the operator computer is configured to configure the at least one FPGA based on providing the bitstream to the at least one FPGA.

2. The system according to claim 1, wherein the matrix calculation block is configured to perform an operation on elements of at least one respective input signal in a row-wise parallel manner.

3. The system according to claim 1, wherein the matrix calculation block is configured to process square matrices, wherein the size of the square matrices is selected in such a way that it can include both the input signals of the first matrix operation and the input signals of the second matrix operation, the selection being made based on a respective largest dimension of an input signal, and wherein a calculation of the square matrix is stopped as soon as all elements of an output signal of a currently active matrix operation have been calculated.

4. The system according to claim 1, wherein the matrix calculation block does not buffer an output signal resulting from performing an operation on an input signal.

5. The system according to claim 1, wherein the matrix routing block of the first matrix operation and the matrix routing block of the second matrix operation receive a trigger signal and pass it on in order to determine an active matrix routing block, and wherein the matrix calculation block is always active.

6. The system according to claim 5, wherein upon receipt of the trigger signal, a respective matrix routing block provides respective input signals to the common matrix calculation block and forwards the trigger signal after storing a respective resulting output signal.

7. The system according to claim 1, wherein more than two matrix routing blocks are connected to the common matrix calculation block, and wherein the common matrix calculation block is configured to perform respective matrix operations for all connected matrix routing blocks such that all matrix operations belonging to the common matrix routing block are performed once in each time step of the simulation.

8. The system according to claim 1, wherein the graphical model includes more than one common matrix calculation block, wherein at least two matrix routing blocks are connected to a first common matrix calculation block, and wherein at least two other matrix routing blocks are connected to a second common matrix calculation block.

9. The system according to claim 1, wherein elements of the first multidimensional input signal, the second multidimensional input signal, the third multidimensional input signal, the first multidimensional output signal, and/or the second multidimensional output signal are of a floating point data type.

10. The system according to claim 1, wherein the common matrix calculation block supports different matrix operations, and wherein an active matrix operation is selected based on a control signal.

11. The system according to claim 1, wherein the matrix routing blocks are configured to rename input signals or to move elements to desired areas of the common matrix calculation block, and to output a control signal to the common matrix calculation block to select an active matrix operation.

12. A non-transitory computer-readable storage medium having instructions stored thereon for real-time simulation of an electric circuit, wherein the instructions are executable by a computer system comprising an operator computer configured to execute a graphical modeling environment and to generate a bitstream and a real-time computer comprising at least one programmable logic device, wherein the at least one programmable logic device comprises at least one field-programmable gate array (FPGA), and wherein the instructions, when executed by the computer system, facilitate performance of the following by the computer system:
  modeling the electrical circuit in a graphical model;
  wherein the graphical model includes a first matrix routing block, a second matrix routing block, and a common matrix calculation block;
  wherein the first matrix routing block is configured to receive a first multidimensional input signal and a second multidimensional input signal, wherein the common matrix calculation block is configured to perform a first matrix operation performed on the first multidimensional input signal and the second multidimensional input signal, wherein the first matrix operation produces a first multidimensional output signal, and wherein the first matrix routing block is configured to store the first multidimensional output signal and output the first multidimensional output signal to the second matrix routing block;
  wherein the second matrix routing block is configured to receive the first multidimensional output signal and a third multidimensional input signal, wherein the common matrix calculation block is configured to perform a second matrix operation performed on the first multidimensional output signal and the third multidimensional input signal, wherein the second matrix operation produces a second multidimensional output signal, and wherein the second matrix routing block is configured to store the second multidimensional output signal and output the second multidimensional output signal;
  wherein the bitstream is generated from at least a portion of the graphical model including the first and second matrix operations; and
  wherein the instructions, when executed by the computer system, further facilitate performance of the following by the computer system: configuring the at least one FPGA based on providing the bitstream to the at least one FPGA.

13. The system according to claim 1, wherein the electrical circuit is an electrical motor.

14. A method for real-time simulation of an electric circuit using a computer system comprising an operator computer configured to execute a graphical modeling environment and to generate a bitstream and a real-time computer comprising at least one programmable logic device, wherein the at least one programmable logic device comprises at least one field-programmable gate array (FPGA), and wherein the method comprises:
  modeling, by the operator computer, the electrical circuit in a graphical model;
  wherein the graphical model includes a first matrix routing block, a second matrix routing block, and a common matrix calculation block;
  wherein the first matrix routing block is configured to receive a first multidimensional input signal and a second multidimensional input signal, wherein the common matrix calculation block is configured to perform a first matrix operation performed on the first multidimensional input signal and the second multidimensional input signal, wherein the first matrix operation produces a first multidimensional output signal, and wherein the first matrix routing block is configured to store the first multidimensional output signal and output the first multidimensional output signal to the second matrix routing block;
  wherein the second matrix routing block is configured to receive the first multidimensional output signal and a third multidimensional input signal, wherein the common matrix calculation block is configured to perform a second matrix operation performed on the first multidimensional output signal and the third multidimensional input signal, wherein the second matrix operation produces a second multidimensional output signal, and wherein the second matrix routing block is configured to store the second multidimensional output signal and output the second multidimensional output signal;
  wherein the bitstream is generated from at least a portion of the graphical model including the matrix operations; and
  wherein the method further comprises: configuring the at least one FPGA based on providing the bitstream to the at least one FPGA.

* * * * *